United States Patent [19]

Tahara et al.

[11] Patent Number: 4,467,234
[45] Date of Patent: Aug. 21, 1984

[54] ARMATURE OF ROTATING MACHINE WITH MEANS TO BALANCE THE MUTUAL INDUCTANCE OF ADJACENT PAIRS OF COILS

[75] Inventors: Kazuo Tahara; Takayuki Matsui, both of Hitachi; Hisaya Sasamoto, Mito; Haruo Koharagi; Noriyoshi Takahashi, both of Hitachi; Akira Takemura, Mito, all of Japan

[73] Assignee: Hitachi, Ltd., Tokyo, Japan

[21] Appl. No.: 534,685

[22] Filed: Sep. 22, 1983

[30] Foreign Application Priority Data

Sep. 24, 1982 [JP] Japan ................................ 57-164895

[51] Int. Cl.³ .......................................... H02K 3/48
[52] U.S. Cl. .................................... 310/195; 310/220; 310/270; 310/114
[58] Field of Search ............... 310/195, 196, 198, 270, 310/214, 180, 220–226, 200–208, 124–126

[56] References Cited

U.S. PATENT DOCUMENTS

| | | | |
|---|---|---|---|
| 2,053,422 | 9/1936 | Calvert | 310/196 |
| 2,318,074 | 5/1943 | Hill et al. | 310/196 |
| 2,593,900 | 4/1952 | Kuehlthau | 310/196 |
| 3,354,331 | 11/1967 | Broeker et al. | 310/196 |
| 4,341,971 | 7/1982 | Tahara et al. | 310/195 |

FOREIGN PATENT DOCUMENTS 962825  6/1950  France ............................... 310/225

*Primary Examiner*—Mark O. Budd
*Attorney, Agent, or Firm*—Antonelli, Terry & Wands

[57] ABSTRACT

A novel armature of an electric rotating machine is disclosed. The armature core is divided axially into two or more members. The coils of the armature winding are fixed on the armature core in such a way that two or more coil sides are disposed in each slot of one member, and the coil sides disposed in the same slot are arranged in adjacent different slots of the other member. The end of each coil is positioned in a manner to substantially equalize the mutual inductance between each pair of adjacent coil ends.

11 Claims, 11 Drawing Figures

ARMATURE OF ROTATING MACHINE WITH MEANS TO BALANCE THE MUTUAL INDUCTANCE OF ADJACENT PAIRS OF COILS

BACKGROUND OF THE INVENTION

The present invention relates to an armature of an electric rotating machine, or more in particular to an armature of an electric rotating machine comprising an armature core axially divided into a plurality of members, in which a plurality of armature coil sides are contained in each slot of a member, which coil sides are divided into at least two parts and contained in different slots in other members.

Armatures of electric rotating machines of this type are disclosed in U.S. Pat. No. 4,341,971 and France Pat. No. 962,825. In view of the fact that the reactance voltage induced at each coil at the time of commutation and the commutation electromotive force generated in the commutating pole for cancelling the reactance voltage are varied with coils, thus making a satisfactory commutation unobtainable, the armature of U.S. Pat. No. 4,341,971 comprises a structure of each coil side arranged to attain a uniform mutual induction with an adjacent coil in order to equalize the reactance voltage and the commutation electromotive force of each coil. However, no consideration is given to the mutual induction of a coil end with an adjacent coil end, but the form and position of each coil end is determined primarily in a way convenient for fabrication of the armature.

A construction of a coil end conventionally employed by the present applicants will be explained with reference to FIGS. 1 and 2. An armature core 9 is divided axially into a pair of members 9a, 9b having slots 11a, 11b respectively containing armature coils 12. In the first step of the electrical working of these coils, a conductor strand is formed into a predetermined shape in a die and is subjected to insulation. In order to facilitate the insertion of the coil into a slot, the coil ends on commutator side and opposite side, of the coil sides $12a_1$, $12c_1$ and $12b_1$, $12d_1$ contained in the same slot of the core member 9a distant from the commutator 13 are integrally fixed by being wound with armored insulating tape or the like. It is common practice to integrate a plurality of coils in the same slot to facilitate coil insertion into slots for an improved workability.

In an armature having the above-mentioned structure, the reactance voltage and the commutation electromotive force are equalized to some degree as mentioned above, resulting an improved commutation performance. Nevertheless, the commutation performance is still unsatisfactory even after various considerations of the relation between the armature windings and armature core. Unavoidably, the commutation performance in the prior art is thus the best available compromise obtainable.

SUMMARY OF THE INVENTION

Accordingly, it is the object of the present invention to improve the commutation performance of the armature of an electric rotating machine in which a plurality of coil sides contained in each slot of one of a plurality of members into which the armature core is axially divided are contained in different slots of another member.

The inventors, after various research efforts to detect the reasons why the commutation performance cannot be improved beyond a certain limit, have overcome the difficulty. Specifically, it has been found that the leak inductance of a coil under commutation (hereinafter called a commutating coil) is not fully covered when considering the coil sides in the slots of the armature core and that the leak inductance existing at the coil end protruded from the end of the armature core has a considerable effect on the commutation performance. According to the present invention, each coil end is arranged in a manner to attain a uniform mutual induction between each coil end and an adjacent coil end.

DESCRIPTION OF THE PREFERRED EMBODIMENTS

Figure 1:
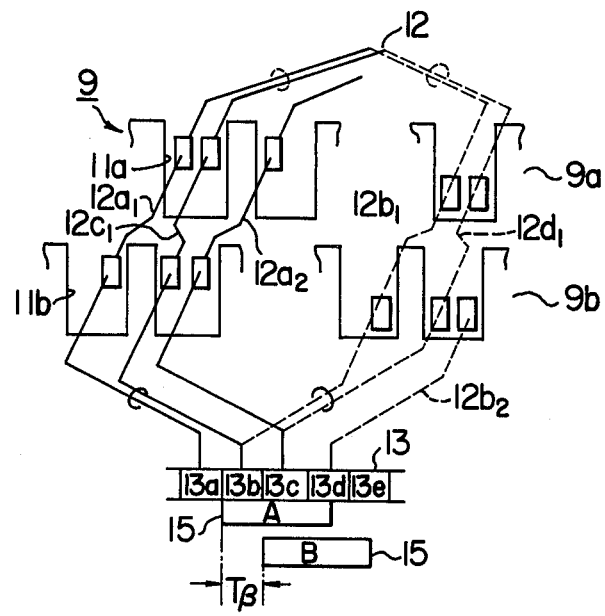
FIG. 1 is a diagram for explaining a conventional arrangement of an armature core and an armature winding permitting a uniform mutual inductance of the commutation coils in the same slot.
Figure 2:
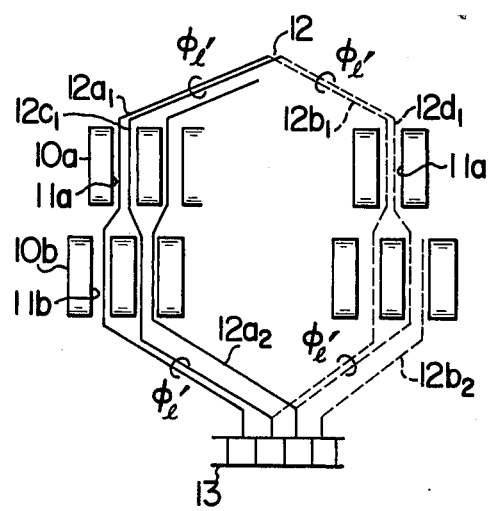
FIG. 2 is a development of the armature of FIG. 1.

For facilitating an understanding of the present invention, the matters made clear by the inventors will be explained with reference to FIGS. 1 and 2.

Upper coils $12a_1$ and $12c_1$, which are in the same slot 11a, are disposed separately in adjacent slots 11b. As a result, the commutation coil sides $12c_1$ and $12d_1$ are shorted by a brush 15 at a point A of the brush 15 where the shorting of commutator segments 13a and 13b ends, so that mutual induction occurs between the commutation coil sides $12c_1$, $12d_1$ and the coil sides $12a_1$, $12b_1$ respectively contained in the same slot. Consequently, mutual induction is caused between adjacent upper coils, between adjacent lower coils and also between upper and lower sides of the commutation coils under the brush which are in the same slot and of different polarities. In this way, the mutual inductance of each coil side is equalized, thus attaining a uniform effective inductance of each commutation coil. In spite of this, the leak inductance of the commutation coils is present also at coil ends in addition to the coil sides. Especially, the effect of mutual inductance presents itself at coil ends integrated with each other as shown in FIGS. 1 and 2. When a pair of adjacent coils are integrated as mentioned above, the mutual inductance is caused between the coils in the slot 11a and at the ends thereof since the commutation coils $12c_1$ and $12d_1$ are shorted at the point A of the brush 15 at the end of commutation of the commutation coils $12a_1$ and $12b_1$. When the commutator is relocated the brush to point B, however, the effect of mutual inductance is reduced as compared with when the brush is positioned at point A since the commutation coil $12a_2$, $12b_2$ shorted by the brush is not proximate the commutation coil $12c_1$, $12d_1$ at the end of commutation. The result is that the leak inductance of the commutation coil $12a_1$, $12b_1$ is different from that of the commutation coil $12c_1$, $12d_1$, thereby deteriorating the commutation performance.

According to the present invention, in order to achieve the above-mentioned object, the intervals between adjacent coil ends are determined in a manner to equalize the mutual inductance caused between each adjacent pair of coil ends.

An embodiment of the present invention will be explained below with reference to FIG. 3 and other drawings.

Figure 3:
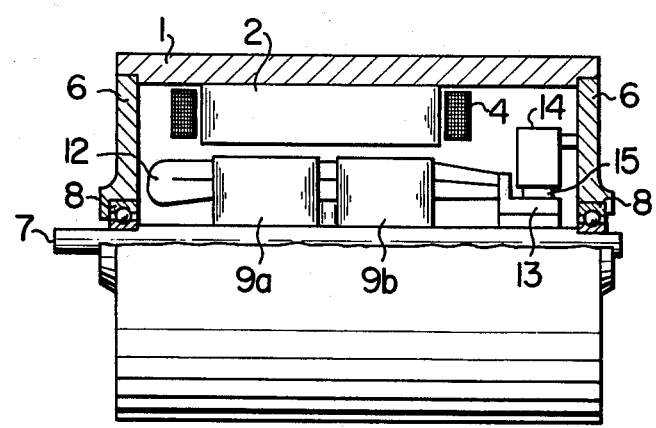
FIGS. 3 and 4 are a longitudinal side view and a cross sectional front view respectively of the upper half part of an example of a DC machine to which the present invention is applied.
Figure 4:
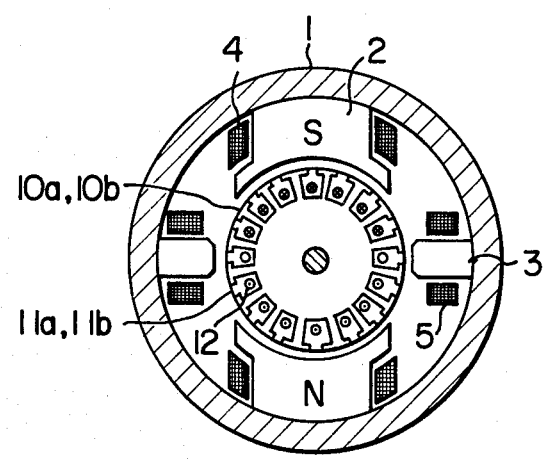

FIGS. 3 and 4 show a longitudinal sectional view and a cross sectional view of the upper half of an example of a DC machine comprising an armature according to the present invention. In these drawings, numeral 1 designates a yoke, numerals 2 and 3 a field core and a commutating pole fixed on the yoke 1, respectively, and numerals 4 and 5 a field winding and a commutating winding wound on the field core 2 and the commutating pole 3 respectively. Numeral 6 designates end brackets mounted on the opening ends of the yoke 1. A bearing 8 is provided at the central portion of each of the brackets. The members 1 to 6 make up a stator.

Numeral 7 designates a shaft supported on the end brackets 6 through the bearing 8, and numeral 9 an armature core secured to the shaft 7 and including two members 9a and 9b axially divided. The armature core 9 further includes a multiplicity of teeth 10a, 10b and slots 11a, 11b formed on the outer periphery thereof. Numeral 12 designates an armature winding wound in the slots 11a, 11b and numeral 13 a commutator secured to the shaft 7. These members 7 to 13 make up a rotor, namely, an armature.

Figure 5:
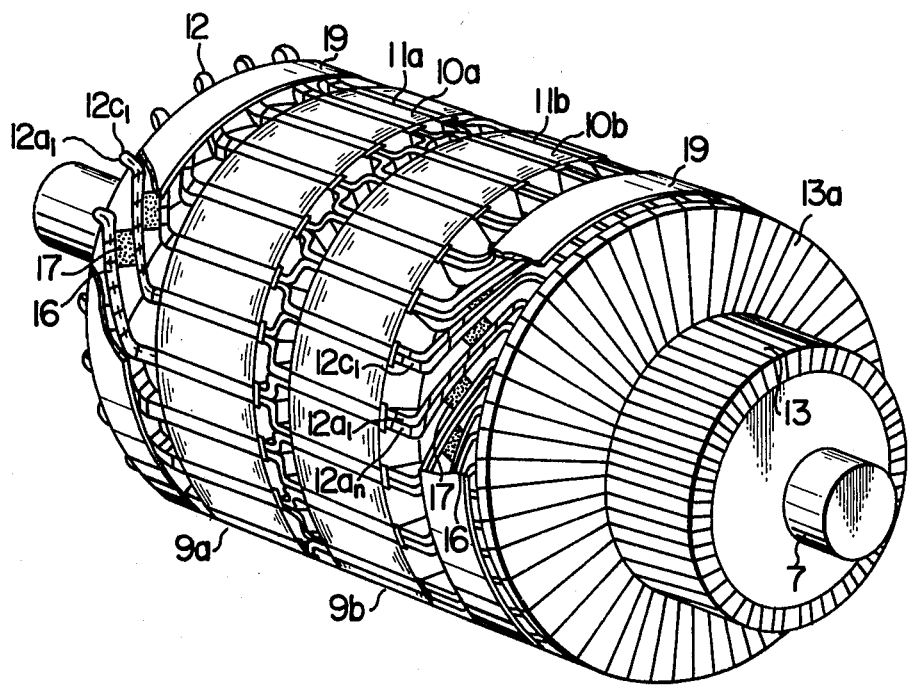
FIG. 5 is a perspective view of an armature according to an embodiment of the present invention.
Figure 6:
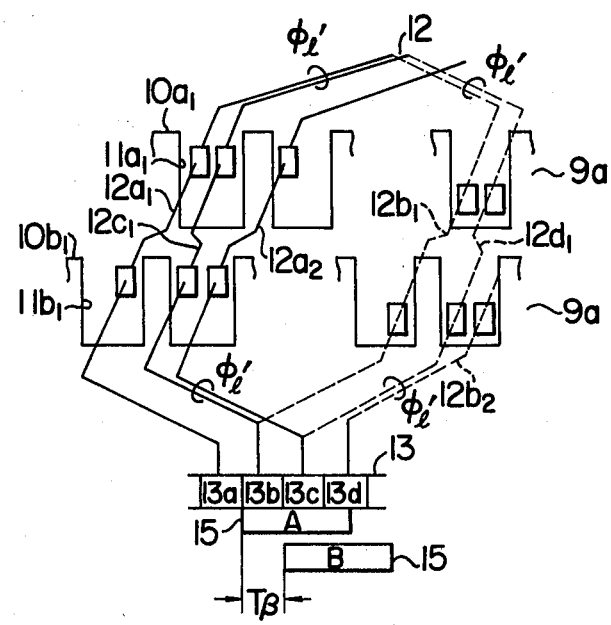
FIGS. 6 and 7 are a diagram for explaining the commutating operation and a development of the armature in the embodiment shown in FIG. 5.
Figure 7:
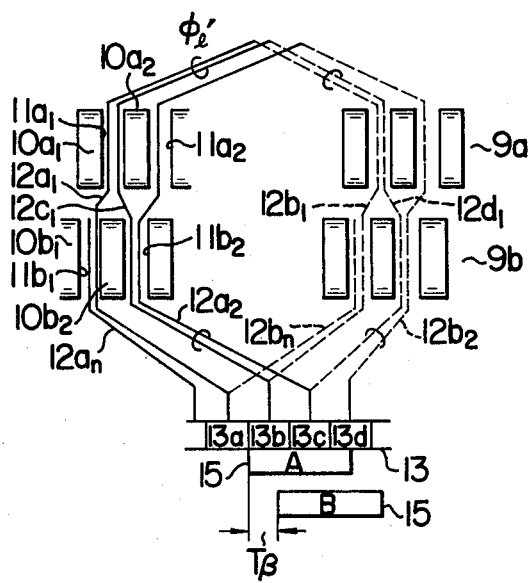

Further, the armature is constructed as shown in FIGS. 5 to 7. In the case where a pair of coil sides is contained in a slot as in the present embodiment, the armature core is divided into a pair of members 9a and 9b axially in the effective length of the armature core, so that the teeth $10a_1$, $10a_2$ and slots $11a_1$, $11a_2$ of one divided core member are displaced circumferentially from the teeth $10b_1$, $10b_2$ and the slots $11b_1$, $11b_2$ of the other core member by a half slot.

The ends of the upper coil $12a_1$ and the upper coil $12c_1$ on the side of armature core 9a, after being strand-insulated by an insulating tape 16, are coupled with each other and secured by a spacer 17. The outer periphery of the coils is wound with a glass bind 19. The ends of the coils $12a_1$ and $12c_1$ are thus arranged in closer relation, so that an interlinking magnetic flux $\phi f$ is generated by the current in any of the coils, thus causing a larger mutual induction than between any other coils.

On the side of the armature core 9b, on the other hand, the upper coils $12a_1$ and $12c_1$ are placed in different slots. The effect of mutual induction is increased by arranging the upper coil $12a_1$ close with the upper coil $12a_n$, for example, in the slot $11b_1$, and the upper coil $12c_1$ close with the upper coil $12a_2$ in the slot $11b_2$. Specifically, mutual inductance is caused between the coil ends on the side of the armature core 9a at the end of commutation of the commutation coil $12a_1$, $12b_1$ at point A of the brush 15, while mutual inductance occurs between the coil ends on the side of the armature core 9b at the end of commutation of the commutation coil $12c_1$, $12d_1$ at point B of the brush 15. In this way, a uniform effect of mutual inductance is obtained both in the slots and at coil ends at the end of commutation of every coil. As a result, the reactance voltage depending on the inductance value of the commutation coils is rendered uniform. This permits the no-spark zone of each commutation coil to be made uniform, thereby widening the area of the no-spark zone.

Figure 8:
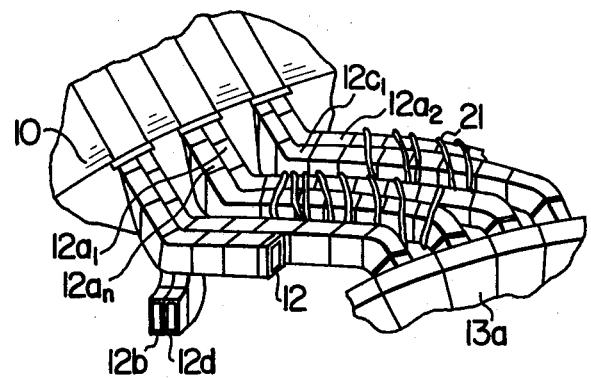
FIGS. 8 and 9 are perspective views of different structures of coil end according to different embodiments of the present invention.

Another construction of coil ends is shown in FIG. 8. After strand-insulation of the coil ends by the insulating tape 16 or the like, the coil ends $12a_n$ and $12a_1$, which are to be closely arranged with each other, are co-bound by a glass string 21. Each coil end, which has a rigidity by itself, is not required to be used with any special fixing member, although a spacer not shown may be inserted between the integrated coil ends to fix the coil ends securely. Further, the outer periphery of the coil ends may be wound with a glass bind to resist the centrifugal force.

Figure 9:
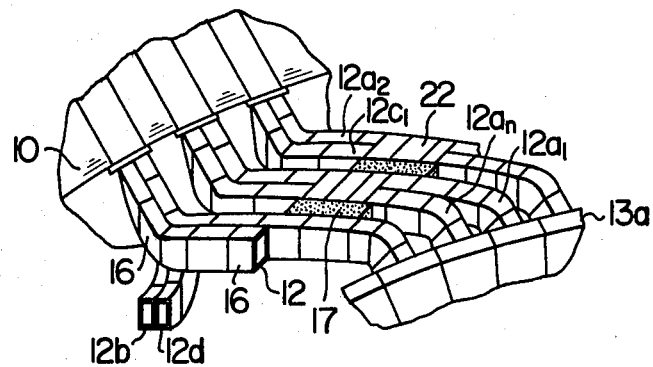

FIG. 9 shows a construction in which, after coil strands are insulated by the insulating tape wound thereon, the coil ends to be closely arranged with each other are coupled with each other and integrated by being co-bound by glass tape 22 or the like, and a spacer 17 is inserted between the coil ends to fix the coil ends securely, thus maintaining a predetermined interval between each pair of coil ends.

Figure 10:
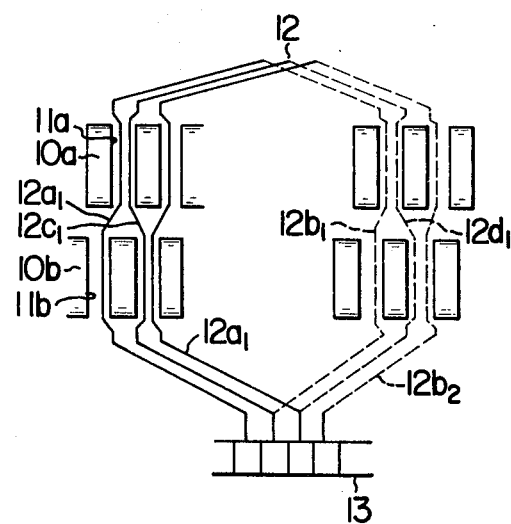
FIG. 10 is a development of an armature according to a further embodiment of the present invention.
Figure 11:
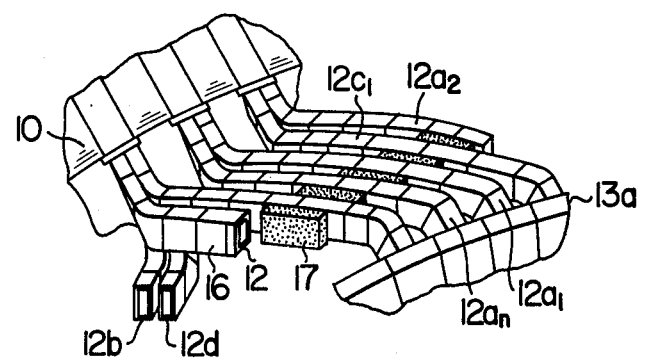
FIG. 11 is a perspective view showing the structure of coil end in the embodiment of FIG. 10.

A still further embodiment is shown in FIG. 10. This embodiment is different from the embodiments of FIGS. 5 to 9 in that the ends of the commutation coils are arranged equidistantly from each other. As shown in FIG. 11, after strand insulation with the insulating tape 16, a spacer 17 is inserted between every adjacent pair of coil ends thereby to maintain a substantially equal interval between each adjacent pair of coil ends. This construction reduces the mutual inductance between coil ends. In view of the fact that equal mutual inductance is caused between every pair of coil ends, however, the inductance at the end of every coil is equal as in the previous embodiments, thus widening the no-spark zone.

It will be understood from the foregoing description that according to the present invention, the coil ends protruded from the ends of the armature core are arranged in such a spaced relation with each other that the effect of mutual inductance between every adjacent pair of the coil ends is equal, with the result that the commutation electromotive force and inductance of the whole windings are rendered sufficiently uniform, thus providing an armature with high commutation performance.

We claim:

1. An armature of a rotating machine, comprising:
   an armature core axially laminated and divided into a pair of members, said armature including a plurality of slots extending in axial direction;
   an armature winding including a plurality of coils, wherein at least two coil sides disposed in a slot of a member of said armature core are separated at least into two and disposed in different slots of the other member of said armature core; and
   means for setting the position of each coil end in such a manner that the effect of mutual inductance is substantially uniform between every pair of adjacent ends of the coils protruded from the ends of said armature core.

2. An armature according to claim 1, wherein said means for setting the position of coil ends sets the position of coil ends in such a manner that the coil ends corresponding to said coil sides disposed in the same slot of said member located at the end of said armature core are placed closely with each other through an insulating member.

3. An armature according to claim 2, wherein said means for setting the position of coil ends are spacers inserted between adjacent ones of a plurality of sets of coil ends closely arranged, in order to maintain a substantially uniform interval between every adjacent pair of said sets of coil ends.

4. An armature according to claim 3, wherein said means for setting the position of coil ends further includes an insulating winding member for integrally securing said coil ends closely arranged to each other.

5. An armature according to claim 2, wherein said means for setting the position of coil ends are binding members wound on the outer periphery of all of said coil ends on at least one end of said armature core.

6. An armature according to claim 5, wherein said means for setting the position of coil ends further includes a spacer inserted between every two adjacent sets of the pair of closely-arranged coil ends in such a manner that said adjacent sets are in substantially equidistantly spaced relation with each other.

7. An armature according to claim 1, wherein said means for setting the position of coil ends sets the position of each coil end by taking advantage of the rigidity of each coil.

8. An armature according to claim 1, wherein said means for setting the position of coil ends sets the position of coil ends in such a manner that the distance between every adjacent pair of coil ends is substantially uniform.

9. An armature according to claim 8, wherein said means for setting the position of coil ends is spacers each inserted between every adjacent pair of the coil ends.

10. An armature according to claim 1, wherein said armature winding is so constructed that said coil sides disposed in the same slot of said one member are disposed in adjacent slots of the other member adjacent to said one member.

11. An armature according to claim 1, wherein said slots of said one member of said armature core are displaced by a half slot in pitch from those slots of said other member adjacent to said one member.

* * * * *